Oct. 10, 1944.            J. O. HAMREN            2,359,758
TANK STRUCTURE
Filed Jan. 23, 1942            4 Sheets-Sheet 2
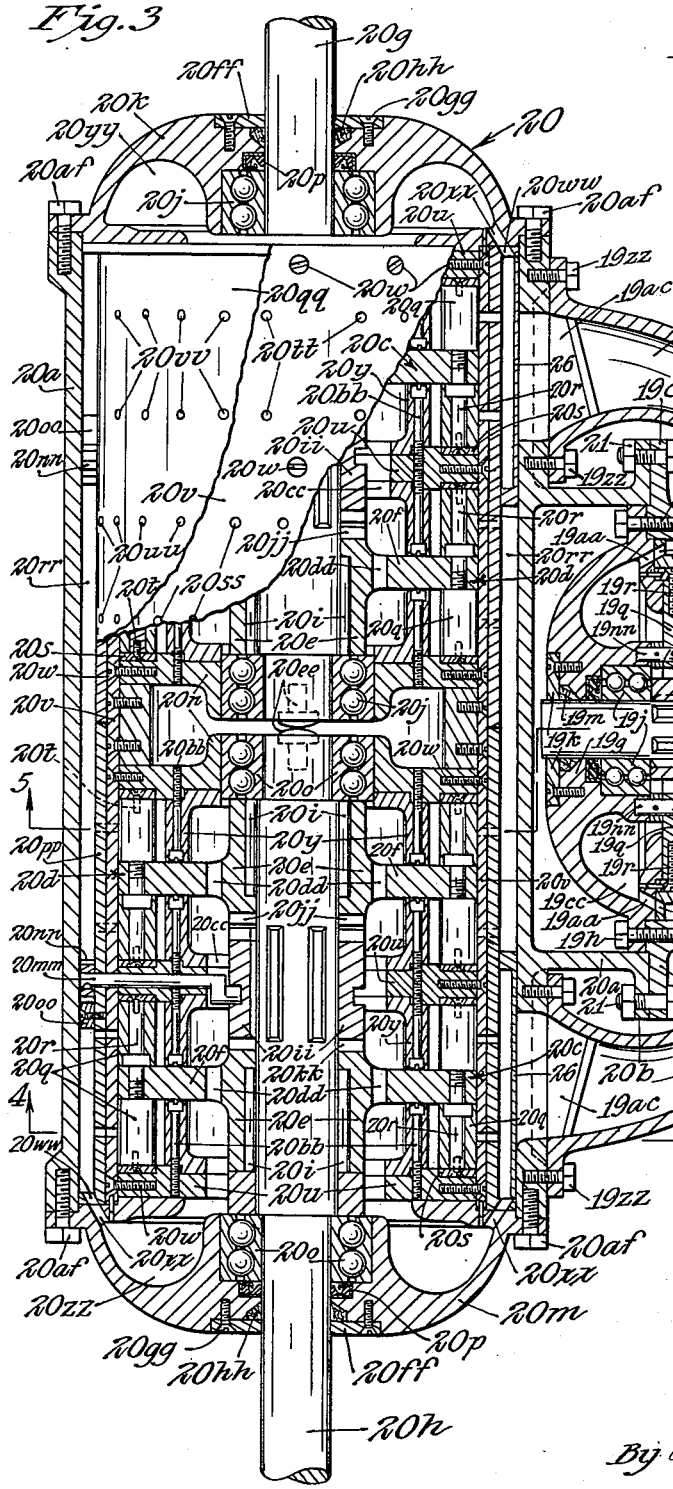
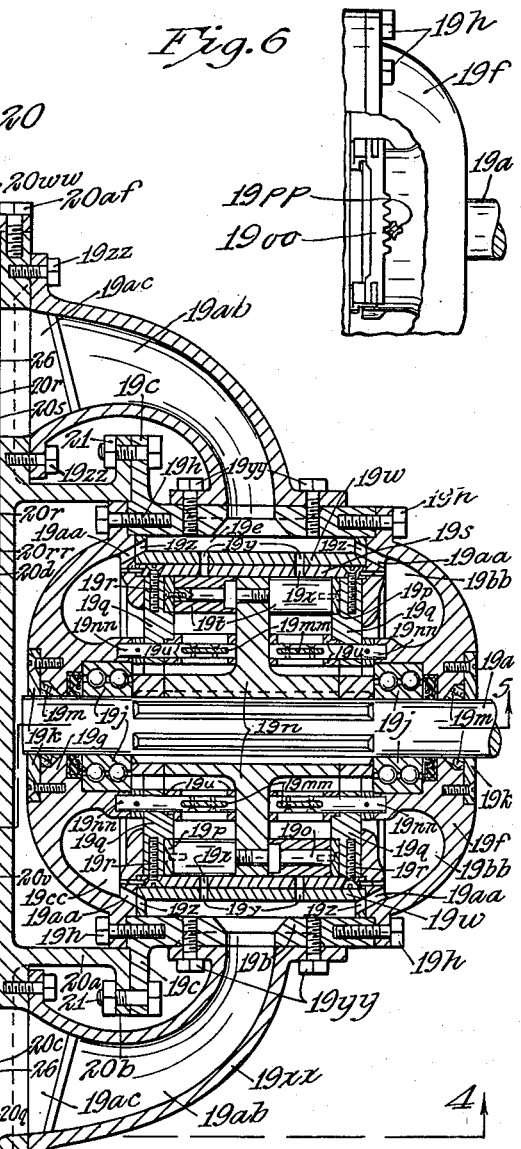
Inventor
Joseph O. Hamren
By Chas. C. Reif
Attorney Oct. 10, 1944.                J. O. HAMREN                2,359,758
                             TANK STRUCTURE
                          Filed Jan. 23, 1942         4 Sheets-Sheet 3
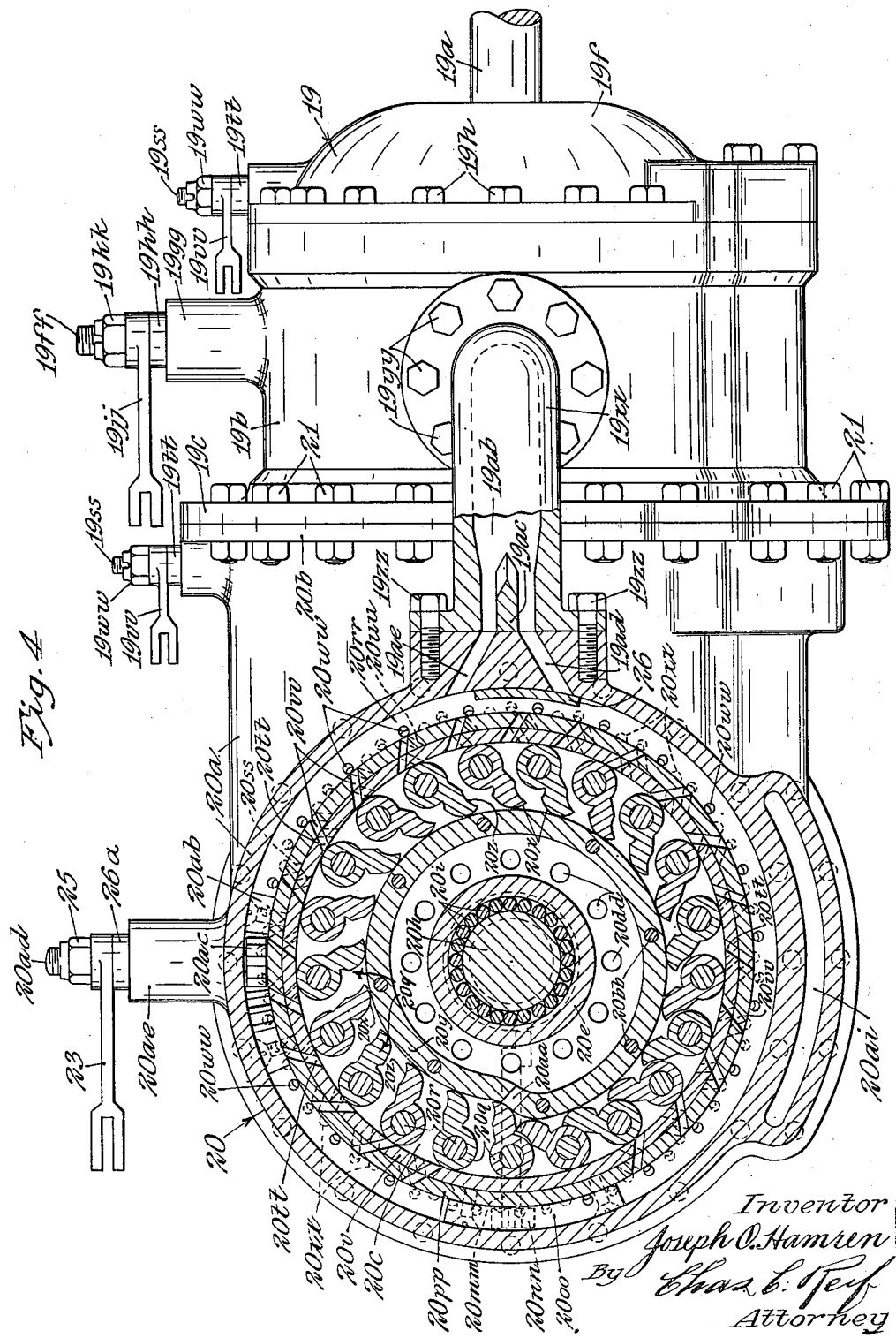
Inventor
Joseph O. Hamren
By Chas. E. Reif
Attorney

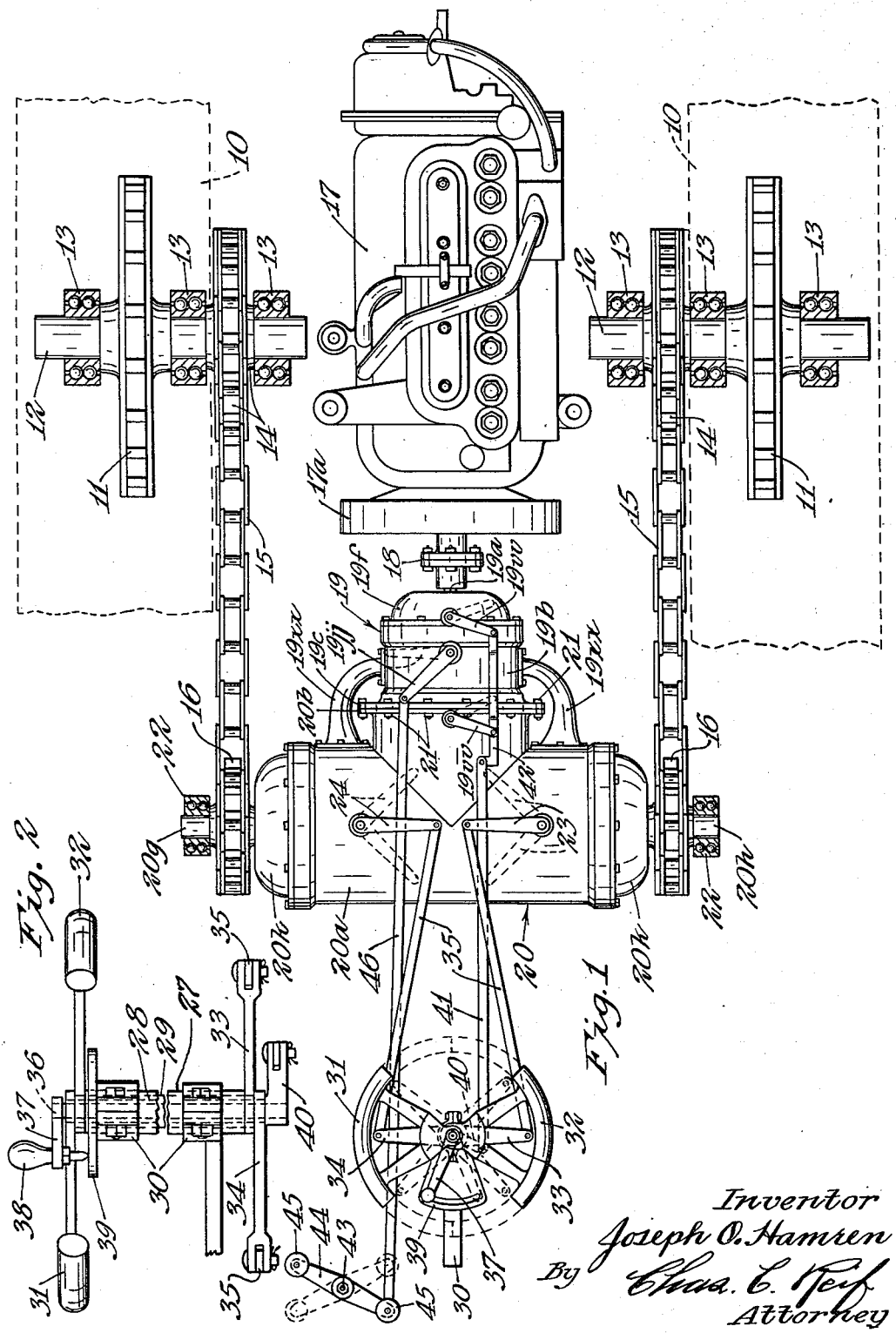

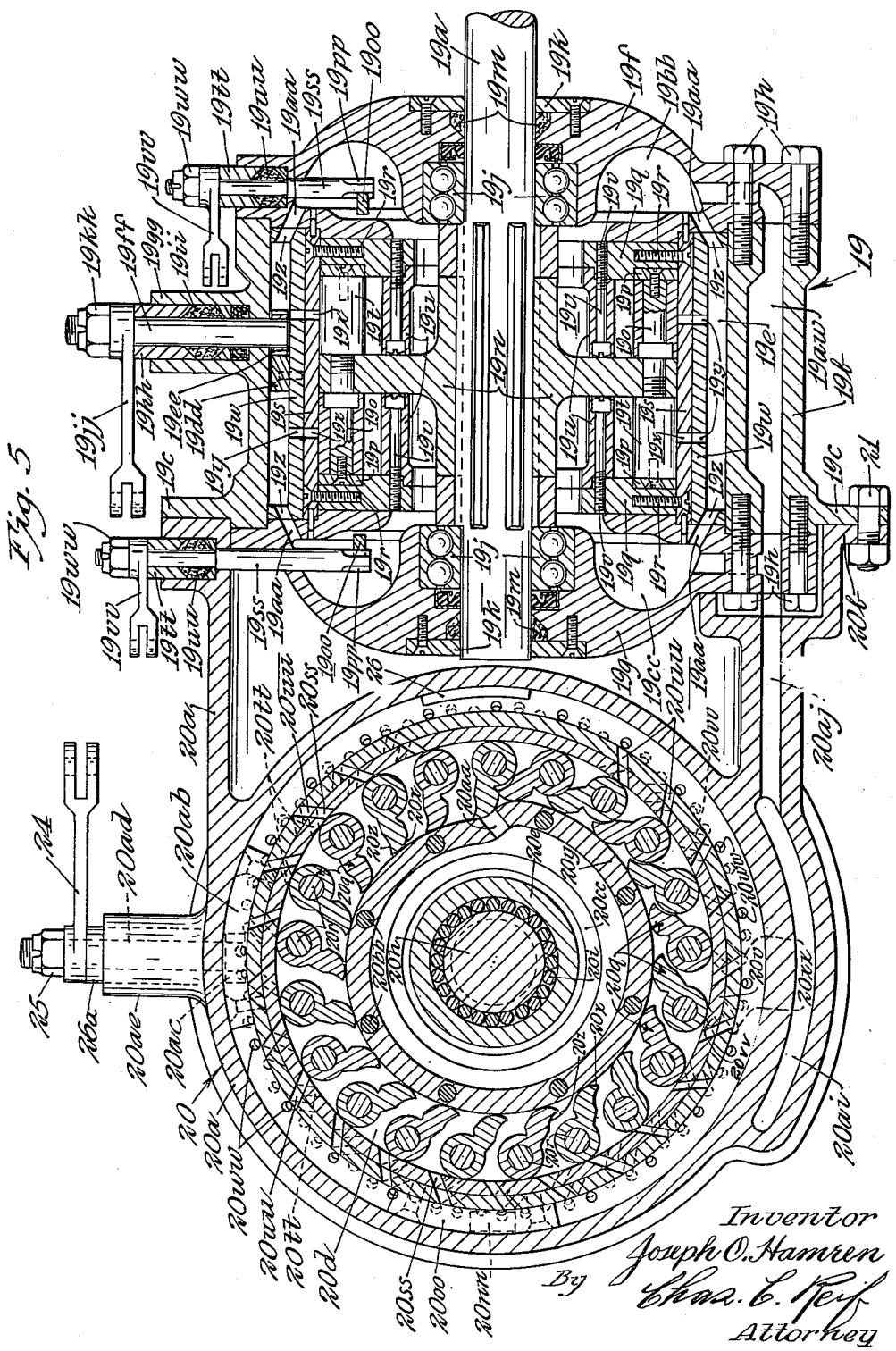

Patented Oct. 10, 1944

2,359,758

UNITED STATES PATENT OFFICE 2,359,758

TANK STRUCTURE

Joseph O. Hamren, Minneapolis, Minn.

Application January 23, 1942, Serial No. 427,871

11 Claims. (Cl. 180—9.2)

This invention relates to a vehicle and particularly to such a vehicle as an army or military tank.

It has long been realized by those familiar with tank design that certain structural features and functions are desirable in a military tank. A tank should have a large number of different speeds and the ideal purpose generally been considered to have an infinite number of speeds from zero to maximum. Furthermore, a tank should have such a structure that it can be very easily maneuvered, or in other words, to be capable of being very quickly reversed in direction and very quickly turned. A tank should also have a minimum of parts subject to breakage or injury. It is also desirable in a tank construction to have the engine at the rear and to have the driver well to the front.

It is an object of this invention to produce a structure of tank in which all gears are eliminated and in which the use of friction clutches is avoided, the parts of the tank being few and simple and well adapted for production.

It is a further object of the invention to provide a tank structure comprising an engine preferably of the internal combustion type, a pump directly driven by said engine, a fluid driven motor supplied with fluid from said pump and capable of forward and reverse motion, said motor being connected to the endless tracks of the tank for driving the latter.

It is another object of the invention to provide a structure of tank having endless tracks, which structure comprises an engine, a pump driven by said engine, a fluid motor operated by fluid from said pump, said motor having a pair of forward rotors, a pair of reverse rotors, a pair of shafts with means for connecting each of said shafts to either a forward or reverse rotor, said shafts being connected with the driving means for the tracks for driving the latter.

It is still another object of the invention to provide a structure of tank having endless tracks and driving means therefor comprising an internal combustion engine located at the rear of the tank, a fluid pump in front of said engine and driven thereby, a fluid motor in front of said pump driven with fluid supplied by said pump, said motor having a pair of forward rotors, a pair of reverse rotors and a pair of aligned shafts with means for connecting each of said shafts to either the forward or reverse rotor, said shafts projecting from said motor and having means thereon for driving said track driving means.

It is another object of the invention to provide such a structure as set forth in the preceding paragraph together with a control means preferably located forwardly of said motor and arranged to be manipulated by the driver or operator of the tank, said control means actuating the means for connecting said shafts to the rotors as well as the means for directing the fluid either to the forward or reverse rotors.

It is still another object of the invention to provide such a tank structure as above set forth together with a torque changing means for said pump and means under the control of the operator for operating said means.

Another object of the invention is to provide a bypass mechanism for said pump together with means manipulatable by the operator for operating said bypass means so that the engine and pump may be driven without supplying fluid to said motor.

It is more specifically an object of the invention to provide a structure of tank having endless tracks and sprockets for driving said tracks comprising an internal combustion engine, a fluid pump to which said engine is directly connected preferably by a flexible coupling, a fluid motor driven by fluid supplied by said pump, said motor having a pair of forward rotors, a pair of reverse rotors and a pair of axially aligned shafts with means for connecting either shaft to a forward or reverse rotor, means under the control of the operator for actuating said last mentioned means as well as means for directing fluid to either said forward or reverse rotors, said shafts projecting at opposite ends of said motor and having sprockets secured thereto over which run chains for driving said track driving sprockets.

These and other objects and advantages of the invention will be fully set forth in the following description made in connection with the accompanying drawings in which like reference characters refer to similar parts throughout the several views and in which:

Fig. 1 is a plan view of certain parts of the tank structure, the endless tracks of the tank being shown in dotted lines and certain parts being broken away and others shown in horizontal section.

Fig. 2 is a view in side elevation of certain control means;

Fig. 3 is mainly a central horizontal section through the pump and fluid motor, some parts being broken away and others shown in plan;

Fig. 4 is a view partly in side elevation of the pump and partly in vertical section taken on line 4—4 of Fig. 3 as indicated by the arrows;

Fig. 5 is a vertical section taken on line 5—5 of Fig. 3 as indicated by the arrows;

Fig. 6 is a plan view of the torque changing mechanism; and

Fig. 7 is a small radial section through the torque changing mechanism of the pump.

Referring to the drawings, particularly Fig. 1, a structure comprising certain novel parts of the tank is shown, which tank will be provided with endless supporting and driving tracks 10.

These tracks will, as customary, be driven by driving sprockets 11. Said driving sprockets are shown as carried on shafts 12 suitably journalled in bearings 13 which will be carried on the tank frame and which bearings are shown as of the ball type. Shafts 12 are shown as also carrying sprockets 14 over which run chains 15 also running over sprockets 16.

An engine 17 is shown and while this might vary in type, it preferably will be of the usual internal combustion type. Said engine is shown as having a flywheel 17a and the crank shaft or driving shaft of said engine will be connected to a coupling 18. While different types of couplings might be used, preferably a coupling having some flexibility will be provided, which couplings are now of commerce. Coupling 18 is also connected to the driving shaft 19a of a fluid pump 19. Pump 19 is in turn connected to a fluid motor 20. Pump 19 has an enclosing housing or casing 19b provided with a flange 19c. While pump 19 could be mounted in various ways in the embodiment of the invention illustrated it is shown as connected directly and rigidly to the housing or casing 20a of the motor 20. Said housing or casing 20a has a part thereof and flange 20b mating with flange 19c and these flanges are rigidly connected by the plurality of circumferentially spaced headed and nutted bolts 21.

The fluid motor 20 has a pair of rotors 20c which may be designated the forward rotors and will be used to propel the tank forwardly and said motor has a pair of rotors 20d which may be designated the reverse rotors and which will be used to propel the tank rearwardly. Said rotors are of similar structure and each comprises a hub 20e and a disk 20f extending radially therefrom. It will be noted that the rotors 20c are at the remote ends of the motor 20 while the rotors 20d are adjacent each other. The rotors 20c and their adjacent rotors 20d rotate respectively about shafts 20g and 20h. The hubs 20e of the rotors are journaled on said shafts respectively and are shown as carried on needle bearings 20i surrounding said shaft. The shafts 20g and 20h carry the sprockets 16 shown in Fig. 1 and said shafts project from the motor 20 and will be journalled in bearings 22 outside of sprockets 16, which bearings will be mounted in the tank frame. Shaft 20g is also journalled in bearings 20j shown as of the ball type, said bearings being mounted respectively in the end member 20k of the housing 20a and in one of a pair of plates or disks 20n within casing or housing 20a. Shaft 20h is also journalled in similar bearings 20o carried respectively in the other end member 20m of housing 20a and the other plate or disk 20n. Dust rings or washers 20p are disposed in recesses at the outer sides of the bearings 20j and 20o and end members 20k and 20m and closely surround the shafts 20g and 20h respectively. Each of said rotors comprises a plurality of vanes 20q oscillatably mounted on studs or shafts 20r having one end threaded in the disk 20f and the other end secured to a ring 20s by small screws 20t. The studs 20r project at opposite sides of the disks 20f and are arranged in staggered relation circumferentially at the opposite sides of said disk. Rings 20s are seated in recesses in a ring or disk 20u secured in a cylindrical casing 20v by the headed screws 20w. It will be noted that the bores in disks 20f which receive the studs 20r are threaded for only a portion of their length. The studs 20r have cylindrical portions fitting in parts of said bores. Studs 20r also have a collar formed thereon which is seated in a bore in the vanes 20q. The vanes 20q have convex surfaces 20x arranged to engage and ride upon the outer convex surface of a cam member 20y and said vanes have concave surfaces 20z arranged to engage and fit snugly about the hubs of adjacent vanes. The cam members 20y are hollow and of somewhat distorted cylindrical form and are provided with an opening 20aa therethrough through which the fluid passes after engaging the vanes 20q. The cam members 20y are secured by headed bolts 20bb which extend longitudinally thereof and are threaded into the plates or rings 20n and 20u respectively. It will be noted that there is a plate 20u between the adjacent rotors and a plate 20u at the end of the cylindrical member 20v. The plates 20n are at the center of the casing 20v and as before described, carry the ball bearings 20j and 20o. The bolts 20bb have their heads countersunk into the cam members 20y. The cam members 20y have central openings 20cc and the disks 20f of the rotors have holes 20dd extending therethrough substantially aligned radially with the holes or openings 20cc. Shafts 20g and 20h at their adjacent ends each have secured therein the small stud 20ee having a semi-spherical head, which heads are in engagement. The end members 20k and 20m are recessed at their outer ends and each receives a plate 20ff secured therein by headed countersunk screws 20gg, which plate engages and holds in place a quantity of packing material 20hh disposed in a recess in the end member and which surrounds the shafts 20g and 20h respectively.

Splined to each of the shafts 20g and 20h respectively is a clutch member 20ii having at each end a half-clutch comprising circumferentially arranged teeth and said half-clutches are adapted to engage with half-clutches 20jj and 20kk formed on the vanes of the hubs of the adjacent rotors 20c and 20d respectively. The clutch members 20ii are arranged to be moved by a crank shaft 20mm journalled in and extending radially through the rings 20u between the rotors, said crank shafts having secured to their ends just within the housing 20a small pinions 20nn. Pinions 20nn engage with a rack 20oo secured to sleeves 20pp and 20qq respectively which surround and snugly fit on the casing 20v. It will be seen that the adjacent ends of the sleeves 20pp and 20qq are spaced from the inner side of housing 20a, thus forming an annular chamber 20rr. The cylindrical casing 20v is provided with a series of holes 20ss inclined at an angle to the radius thereof and with another series of holes 20tt also inclined at an angle to the radius of said casing but extending in an opposite direction to the openings 20ss. The sleeves 20pp and 20qq are each provided with a series of holes 20uu extending at an angle to the radius of said sleeves, which angle is the same at which the holes 20ss extend and the holes 20uu are adapted to be brought into and out of alignment with holes 20ss as shown in Fig. 5. Said sleeves are also provided with another series of holes 20vv extending at an angle to the radius thereof, which angle is the same at which the holes 20uu extend but holes 20vv extend in the opposite direction and are adapted to be brought into and out of alignment with the holes 20tt in casing 20v as shown in Fig. 4. Each of the sleeves 20pp and 20qq has a radial flange at its end adjacent the end member of the casing 20a, which flange abuts said end member and has extending therethrough openings or holes 20ww. Holes 20ww are adapted to come into and out of alignment with holes 20xx extending through the end members 20k and 20m respectively and into chambers 20yy and 20zz therein. The sleeves 20pp and 20qq are adapted to be oscillated and for this purpose each has secured thereto a rack 20ab with which meshes a pinion 20ac. Pinion 20ac is secured to a shaft 20ad which extends through a boss 20ae on housing 20a. A packing gland 26a extends in the boss 20ae and will engage packing about the shaft 20ad. It will be understood that there is a rack and pinion for each sleeve and the shaft 20ad for sleeve 20pp has secured thereto an arm 23 shown in Fig. 4. The shaft 20ad for the sleeve 20qq has secured thereto an arm 24. The outer portion of each shaft 20ad is threaded and receives a nut 25 illustrated as of the castle type. The end members 20k and 20m are secured to the intermediate portion of housing 20a by the headed bolts 20af.

The pump 19 illustrated has the same general structure as the fluid motor 20. There is a chamber 19e within the wall of housing 19b and said motor has end members 19f and 19g secured to the intermediate portion of housing 19b by the headed bolts 19h. The pump driving shaft 19a extends axially through end members 19f and 19g, being journalled in bearings 19j therein, which bearings are shown as of the ball type. End members 19f and 19g are recessed to receive plates 19k in their outer ends which are secured therein by screws with countersunk heads and said plates engage packing material 19m disposed in recesses in said end members, which packing material surrounds shaft 19a. Shaft 19a has secured thereto a rotor 19n having a radially extending plate or disk to which are secured a plurality of studs 19o, which studs are similar to the studs 20r already described. Studs 19o are also secured to rings 19p seated in recesses in end plates 19q at each end of the pump, which end plates are secured by bolts 19r which extend through and have their heads countersunk in a cylindrical casing 19s to the inner wall of which the disk 19n extends. Studs 19o have mounted for oscillation thereon vanes 19t, which vanes are similar to vanes 20q already described. The studs 19o project at opposite sides of the central disk of rotor 19n and are in staggered relation circumferentially at opposite sides of said disk. The vanes 19t respectively engage and move upon the outer surface of cam members 19u similar to cam member 20y already described. Cam members 19u are secured to the disks 19q respectively by headed bolts 19v having their heads countersunk in cam members 19u. The cylindrical casing 19s is surrounded by an oscillatable sleeve 19w which fits very closely on casing 19s. Casing 19s has a multiplicity of holes 19x with which holes 19y in sleeve 19w are arranged to come more or less into alignment. Sleeve 19w has end flanges through which extend holes 19z which are arranged to come into and out of alignment with holes 19aa extending through the end members 19f and 19g and into the end chambers 19bb and 19cc thereof. The sleeve 19w is as stated, arranged for oscillation and for this purpose it has secured thereto a rack 19dd with which meshes a pinion 19ee secured to a shaft 19ff extending through a boss 19gg on the pump housing 19b. A packing gland 19hh fits into boss 19gg and engages packing material 19ii disposed about shaft 19ff. Shaft 19ff has secured thereto an operating arm 19jj and said shaft is threaded at its outer end to receive a nut 19kk.

Pump 19 is provided with a torque changing or converting mechanism and this comprises a member 19mm which is disposed in the opening through the cam member 19u. Member 19mm is oscillatable with a shaft 19nn so as to be moved to position to close more or less said opening. There will be two shafts 19nn for each of said cam members 19u and these shafts are journalled in the end members 19f and 19g. Said shafts have secured thereto gear segments 19oo. These gear segments are in mesh with pinions 19pp formed on or secured to the lower ends of shaft 19ss. Shaft 19ss is journaled in each end of the pump housing and is surrounded by a packing gland 19tt engaging packing 19uu. An operating arm 19vv is secured to each of the shafts 19ss and is surmounted by a nut 19ww secured on the threaded end of shaft 19ss.

Pump 19 is provided with outlet members 19xx at each side thereof, the same having flanges engaging pump housing 19a and being bolted thereto by bolts 19yy, said members having other flanges engaging the motor housing 20a and bolted thereto by the headed bolts 19zz. The members 19xx have passages 19ab therethrough and these passages are divided by members 19ac into smaller passages 19ad and 19ae communicating with the chamber 20rr of the motor 20. Passages 19ad and 19ae are alternately opened or closed by movement of a plate 26. There are two of these plates, one for each of the sleeves 20pp and 20qq and they are secured to and oscillate with said sleeves.

For controlling the pump and motor certain control members are provided including a pair of concentric hollow shafts 28 and 29. These are disposed within cylinder 27 secured in suitable frame members 30 of the tank. Shafts 28 and 29 have respectively secured to the upper ends thereof semi-hand wheels or grips 31 and 32. Said shafts have respectively secured to the lower ends arms 33 and 34, which latter arms are connected to link rods 35 which connect respectively with the arms 23 and 24 already described. A rod or shaft 36 extends through shaft 29 and has secured to its upper end an operating arm or lever 37 having an actuating knob or handle 38 thereon from which depends a pin adapted to be received in openings in a plate 39 disposed therebeneath. Rod 36 has secured to its lower end an arm 40 which is connected by a link 41 with a bar 42 to which the ends of operating arms 19vv already decribed are connected. Another vertically extending shaft 43 is provided on which is mounted an operating lever 44 provided with operating knobs or handles 45 and to one of which is connected a link rod 46 which is connected at its other end to the operating handle 19jj already described.

The chambers 20yy and 20zz in the end members of housing 20a communicate with a passage 20ai and this passage communicates with a passage 20aj which in turn communicates with the return passage 19aw which communicates with the end chambers 19bb and 19cc of said pump.

In operation, the engine 17 will be driven and this will drive pump 19 through the coupling 18. The coupling 18 is preferably made somewhat flexible to take care of the vibrations caused by the rough actions of the tank, and any possible misalignment. The rotor $19n$ of the pump will be driven or rotated and this will rotate the vanes $19t$. With the holes $19x$ and $19y$ in alignment the pump will discharge through these holes and the fluid will be discharged through passages $19ab$. The fluid will enter the pump through passages $20aj$ and $19aw$ then passing into the end chambers $19bb$ and $19cc$, to the inner sides of the cam members $19u$. These cam members have an opening therethrough similar to the openings $20aa$ and the fluid passes therethrough to come between the vanes $19t$ and is forced through the vanes out through the openings $19x$ and $19y$. The fluid then passes into the passages $19a$ and $19ad$. If the operator wishes to move the tank in a forward direction he will move the semi hand wheels $31$ and $32$ forwardly as indicated in dotted lines in Fig. 1 and this will, through arms $33$ and $34$ and link rods $35$, move arms $23$ and $24$ to the dotted line position shown at the right in Fig. 1. This will oscillate arms $23$ and $24$ and pinions $20ac$ will act on the racks $20ab$ secured to sleeves $20pp$ and $20qq$ oscillating said sleeves. This will bring the holes $20tt$ and $20vv$ into alignment as shown in Fig. 4. Plates $26$ will be moved so as to uncover the passages $19ae$ and close passages $19ad$. The fluid is thus delivered to chamber $20rr$ and will pass through the aligned holes $20vv$ and $20tt$. The fluid thus acts on the vanes $20q$ and the forward rotors $20c$ are rotated. When sleeves $20pp$ and $20qq$ were oscillated by arms $23$ and $24$ the racks $20oo$ were moved and pinions $20nn$ oscillated. This oscillated crank shafts $20mm$ and moved the clutch members $20ii$ to connect them with the forward rotors $20c$. The motor $20$ is thus driven, the forward rotors $20c$ operating and driving shafts $20g$ and $20h$ in a direction to rotate sprockets $16$ and move chains $15$ so as to rotate the driving sprockets $11$ and the tracks to move the latter in a forward direction. With the holes $20tt$ and $20vv$ in full alignment the motor will be driven at its maximum speed. The sleeves $20pp$ and $20qq$ can be oscillated to bring said holes more or less into alignment and the speed can thus be regulated. The regulation of the speed is under the direct control of the operator by moving members $31$ and $32$. To move the tank rearwardly or to reverse it the operator moves the members $31$ and $32$ rearwardly thus moving the arms $23$ and $24$ to the dotted line positions shown at the left in Fig. 1. This moves sleeves $20pp$ and $20qq$ to bring the holes $20ss$ and $20uu$ into alignment as shown in Fig. 5. Plates $26$ are moved to open passages $19ad$ and close passages $19ae$. The fluid is thus delivered through the holes $20uu$ and and $20ss$ the reverse rotors $20d$ are rotated. These rotors are also connected to the shafts $20g$ and $20h$ and the tracks of the tank will be driven so as to move the tank rearwardly. The rearward speed can be controlled by movement of hand wheels $31$ and $32$ just as can the forward speed.

To turn the tank the operator will move one of the hand wheels $31$ forwardly and the other rearwardly. This will result in directing fluid to one forward rotor and one reverse rotor. These rotors will be connected to shafts $20g$ and $20h$ so that one of the tank tracks will be driven in one direction and the other in the opposite direction. This will turn the tank to the right or left depending on which track is being driven forwardly. By driving one track forwardly and the other rearwardly the tank can be turned very quickly and will turn practically about a central vertical axis.

Hand wheels $31$ and $32$ are in the positions shown, arms $33$ and $34$ are in the full line position shown in Fig. 1 and the motor is then in neutral position. At this time none of the holes through the periphery of sleeve $20pp$ and $20qq$ are in alignment with the holes in the cylindrical casing $20v$. On the other hand the holes $20ww$ are in full alignment with the holes $20xx$ and the fluid inside passing to the rotors passes through said latter holes and into the chambers $20yy$ and $20zz$ in the end members $20k$ and $20m$ of the motor housing. From said chambers $20yy$ and $20zz$ the fluid passes to passage $20ai$ and thus passes back to the pump so that the fluid is merely bypassed around the rotors and the motor is not driven. When the holes through the peripheries of sleeves $20pp$ and $20qq$ are partially aligned through the holes in casing $20v$ the holes $20xx$ and $20ww$ are partially in alignment.

The torque changing or converting structure in the pump is provided so that fluid handled can be changed and a greater torque or power produced by the pump. This will put more pressure on the fluid and greater torque can be had in the motor $20$. The operator will control the torque changing mechanism in the pump by movement of lever $37$. This increased torque is used to move the tank through difficult places as through soft ground or mud, up steep hills or through other places where the going is particularly difficult.

The pump can be moved to a bypass position by the operator moving lever $44$. This through link $46$, actuates arm $19jj$ and moves the sleeve $19w$ of the pump. This brings into alignment the openings $19z$ and $19aa$. The fluid moved by the vanes can then pass through the slots or openings $19x$ and $19y$ and can pass through these openings $19z$ and $19aa$ to the chambers $19bb$ and $19cc$ from where it will again pass to the inside of cam members $19u$ and through the openings in the cam members to the vanes. The fluid can thus merely circulate in the pump and will not be delivered with any force to the fluid motor.

From the above description it will be seen that I have provided a very simple, compact and efficient structure of tank. All gears and friction clutches are eliminated. The engine is disposed at the rear of the tank and the operator can sit at the front of the tank in front of the fluid motor to control the tank. Any speed from zero to maximum can be had. The fluid motor illustrated has 21 vanes and in practice this motor would have 237 square inches of pressure surface on the vanes. The fluid motor has been amply demonstrated in practice and found to be very successful and efficient and the same can be made of very high efficiency. The tank is very easily controlled. All controls are arranged for easy manipulation by the operator and he can move the tank forwardly, reverse it or turn it in either direction practically instantly. The tank can thus be maneuvered with great ease and rapidity. There are just three main units; the engine, the pump and the fluid motor. These are arranged so that they will lend themselves to easy protection and a new unit can be easily substituted should one be damaged in action. The structure is very compact and there are no parts which are subject to easy breakage or damage. The parts all lend themselves to mass production. It is obvious that the device will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A tank provided with endless tracks and driving sprockets for said tracks having in combination, an engine at the rear of said tank, a pump in front of said engine and directly connected thereto, a fluid motor in front of said pump and supplied with fluid from said pump, said motor having a pair of forward rotors, a pair of reverse motors and a pair of axially aligned shafts, said shafts extending transversely of said tank, means for connecting each of said shafts to either a forward or reverse rotor, sprockets secured to said shafts and means for driving said track driving sprockets from said last mentioned sprockets.

2. A tank provided with endless tracks and driving sprockets for said tracks having in combination, shafts to which said driving sprockets are secured, a second pair of sprockets secured respectively to said shafts, an engine at the rear of said tank, a pump in front of said engine and directly connected thereto, a fluid motor in front of said pump and supplied with fluid from said pump, said motor having a pair of forward rotors, a pair of reverse rotors and a pair of shafts, means for connecting each of said shafts to either a forward or reverse rotor, a control means in front of said motor constructed and arranged to be manipulated by the operator for actuating said last mentioned means, and sprockets on said last mentioned shafts for driving said second mentioned sprockets.

3. A tank provided with endless tracks and driving sprockets for said tracks having in combination, an internal combustion engine having its crank shaft extending longitudinally of said tank, a pump directly connected to said engine having a driving shaft extending longitudinally of said tank, a fluid motor supplied with fluid from said pump, said motor having a pair of forward rotors, a pair of reverse rotors and a pair of axially aligned shafts, means for connecting each of said shafts to either a forward or reverse rotor, said shafts extending transversely of said tank, shafts carrying said track driving sprockets, sprockets on said first mentioned shafts, sprockets on said last mentioned shafts aligned respectively with said last mentioned sprockets and chains running over said aligned sprockets.

4. A tank provided with endless tracks and driving means for said tracks having in combination, an engine at the rear of said tank, a pump in front of said engine and directly connected thereto, a fluid motor in front of said pump and supplied with fluid from said pump, said motor having a pair of forward rotors, a pair of reverse rotors and a pair of shafts, a control means in front of said motor constructed and arranged to be actuated by the operator, means for directing fluid to either the forward or reverse rotors and connecting each of said shafts to the rotors to which fluid is directed adapted to be actuated by said control means, and means on said shafts for driving said track driving means.

5. A tank provided with endless tracks and driving means for said tracks having in combination, an engine at the rear of said tank, a pump in front of said engine and directly connected thereto, a fluid motor in front of said pump and supplied with fluid from said pump, said motor having a pair of forward rotors, a pair of reverse rotors and a pair of shafts, a control means in front of said motor constructed and arranged to be actuated by the operator, means for directing fluid to either the forward or reverse rotors and connecting each of said shafts to the rotors to which fluid is directed adapted to be actuated by said control means, means on said shafts for driving said track driving means, a torque converting mechanism for said pump, and means constructed and arranged to be manipulated by the operator for controlling said torque converting means to drive said tank at different speeds under varying operating conditions.

6. A tank provided with endless tracks and driving sprockets for said tracks having in combination, shafts to which said driving sprockets are secured, a second pair of sprockets secured to said shafts respectively, an engine at the rear of said tank, a pump in front of said engine and directly connected thereto, a fluid motor in front of said pump and supplied with fluid from said pump, said motor having a pair of forward rotors, a pair of reverse rotors and a pair of shafts, a control means in front of said motor constructed and arranged to be actuated by the operator, means for directing fluid to either the forward or reverse rotors and connecting each of said shafts to the rotors to which fluid is directed adapted to be actuated by said control means, sprockets on said last mentioned shafts, chains running over said last mentioned sprockets and said second pair of sprockets, a bypass mechanism for said pump and means in front of said motor adapted to be manipulated by the operator for actuating said bypass mechanism.

7. A tank provided with endless tracks and driving sprockets for said tracks having in combination, shafts to which said driving sprockets are respectively connected, a second pair of sprockets respectively connected to said shafts, an internal combustion engine, a pump driven by said engine and having an enclosing housing, a fluid motor supplied with fluid from said pump and having an enclosing housing, said pump housing being directly bolted to said motor housing, said motor having a pair of forward rotors, a pair of reverse rotors and a pair of shafts, means for connecting either of said shafts to either a forward or reverse rotor, a control mechanism disposed in front of said motor and adapted to be manipulated by the operator for actuating said last mentioned means, sprockets on said shafts last mentioned respectively and chains running over said last mentioned sprockets and said second pair of sprockets for driving said track driving sprockets.

8. A tank provided with endless tracks and driving members for said tracks having in combination, an engine, a pump driven by said engine, a fluid motor supplied with fluid from said pump, said motor having a pair of forward rotors, a pair of reverse rotors and a pair of shafts, a forward rotor and a reverse rotor for rotating about each shaft, a clutch member splined to each shaft between the forward and reverse rotors, a control means for directing fluid to either the forward or reverse rotors and moving said clutches to connect the same to the rotor to which fluid is directed and means on said shafts for driving said track driving members whereby said tracks may both be driven forwardly or rearwardly or one track may be driven forwardly and the other rearwardly.

9. The structure set forth in claim 8, said control means comprising a pair of shafts, hand wheels respectively secured to said shafts adapted to be moved forwardly and rearwardly and connections between said shafts and clutches whereby when said hand wheels are moved forwardly the forward rotors will be actuated and connected to said clutches and shafts and when said hand wheels are moved rearwardly the reverse rotors will be actuated and connected to said clutches and shafts.

10. A tank provided with endless tracks and driving means for said tracks having in combination, an engine at the rear of said tank, a pump in front of said engine and connected thereto, a fluid motor in front of said pump and supplied with fluid under pressure from said pump, said motor having a pair of forward rotors, a pair of reverse rotors and a pair of axially aligned shafts, means for respectively actuating said forward or reverse rotors and connecting the actuated rotors to said shafts, control devices adapted to be manipulated by the operator for actuating said last mentioned means and also controlling the speed of said rotors, and means on said shafts connected to and driving said track driving means.

11. A tank provided with endless tracks and track driving sprockets having in combination, shafts to which said sprockets are respectively connected, a second pair of sprockets on said shafts respectively for driving said shafts, chains running over said last mentioned sprockets, sprockets over which said chains also respectively run disposed at the rear of said tank, a fluid motor at the rear of said tank comprising shafts extending transversely of said tank to which said last mentioned sprockets are respectively secured, said motor comprising a pair of forward rotors, a pair of reverse rotors and means for connecting each of said last mentioned shafts to either a forward or reverse rotor, a pump for supplying fluid to said motor, an internal combustion engine for driving said pump and control means for said motor pump and engine at the front of said tank.

JOSEPH O. HAMREN.